(12) United States Patent
Johnson et al.

(10) Patent No.: US 8,079,219 B2
(45) Date of Patent: Dec. 20, 2011

(54) IMPINGEMENT COOLED COMBUSTOR SEAL

(75) Inventors: Thomas Edward Johnson, Greer, SC (US); Patrick Benedict Melton, Horse Schoe, NC (US)

(73) Assignee: General Electric Company, Schenectady, NY (US)

( * ) Notice: Subject to any disclaimer, the term of this patent is extended or adjusted under 35 U.S.C. 154(b) by 608 days.

(21) Appl. No.: 12/242,013

(22) Filed: Sep. 30, 2008

(65) Prior Publication Data

US 2010/0077761 A1    Apr. 1, 2010

(51) Int. Cl.
*F02C 1/00*       (2006.01)
(52) U.S. Cl. .............................. 60/752; 60/800; 60/39.37
(58) Field of Classification Search ................ 60/39.37, 60/752, 754–760, 796, 799, 800, 804
See application file for complete search history.

(56) References Cited

U.S. PATENT DOCUMENTS

| 7,007,482 | B2* | 3/2006 | Green et al. | 60/752 |
| 7,269,957 | B2* | 9/2007 | Martling et al. | 60/800 |
| 7,493,767 | B2* | 2/2009 | Bunker et al. | 60/752 |
| 8,006,983 | B2* | 8/2011 | Russell et al. | 277/314 |
| 2005/0268617 | A1* | 12/2005 | Amond et al. | 60/776 |
| 2009/0120093 | A1* | 5/2009 | Johnson et al. | 60/752 |
| 2009/0120096 | A1* | 5/2009 | Tuthill | 60/755 |
| 2009/0255267 | A1* | 10/2009 | Chen et al. | 60/756 |
| 2009/0282833 | A1* | 11/2009 | Hessler et al. | 60/757 |
| 2010/0005803 | A1* | 1/2010 | Tu et al. | 60/752 |

* cited by examiner

*Primary Examiner* — Ehud Gartenberg
*Assistant Examiner* — Michael B Mantyla
(74) *Attorney, Agent, or Firm* — Cantor Colburn LLP

(57) ABSTRACT

Disclosed is a combustor seal including a seal support locatable at a first combustor component and having a plurality of through impingement holes. A wave-shaped seal located at the seal support and defining at least one seal cavity between the wave-shaped seal and the seal support. A peak of the wave-shaped seal is locatable at a second combustor component. The wave-shaped seal includes at least one through passageway located upstream of the peak capable of flowing cooling fluid therethrough into the at least one seal cavity and through the plurality of impingement holes thereby cooling the first combustor component. Further disclosed is a combustor including a combustor seal and a method for cooling a first combustor component.

14 Claims, 5 Drawing Sheets

IMPINGEMENT COOLED COMBUSTOR SEAL

BACKGROUND

The subject invention relates generally to combustors. More particularly, the subject invention relates to cooling of combustion liners of combustors.

Air management is an important consideration in combustor design. Air streams provide an oxidizer for a combustion process and also provide cooling to hot components of the combustor. Seals are typically provided between various components of the combustor to prevent air from leaking into the combustor at unwanted locations. These seals typically include C-Rings, fingered hula rings, cloth seals, and the like, and are subjected to high temperature and pressure as well as high gradients of pressure and temperature across the seals. In modern combustors, high flame temperatures drive a need to actively cool virtually all metal surfaces of the combustor. One method of actively cooling the combustor components in the area of a liner hula seal is to direct cooling air within cooling channels formed between a seal support and one or more of the combustor components to convectively cool the components. Cooling air typically enters the cooling channels through a series of holes in the seal support at an upstream end of the seal support. The cooling air flows within the cooling channels through an entire length of the seal, thereby cooling the first combustor component by convective heat transfer. As the cooling air flows along the channels, however, its efficiency in cooling the component decreases. To counter the loss of efficiency, larger amounts of cooling air are directed through the cooling channels to provide adequate cooling of the component. In combustors, especially those utilized in lean premixed gas turbine engines it is desirable to reduce the amount of air used for cooling to increase the amount of air directed through the fuel nozzles thereby achieving a uniform, lean-premixed fuel to air ratio to increase combustor performance.

BRIEF DESCRIPTION OF THE INVENTION

According to one aspect of the invention, a combustor seal assembly includes a seal support having a plurality of through impingement holes and locatable at a first combustor component. A wave-shaped seal is located at the seal support and defines at least one seal cavity between the wave-shaped seal and the seal support. A peak of the wave-shaped seal is locatable at a second combustor component. The wave-shaped seal includes at least one through passageway located upstream of the peak capable of flowing cooling fluid therethrough into the at least one seal cavity and through the plurality of impingement holes thereby cooling the first combustor component.

According to another aspect of the invention, a combustor includes a first combustor component and a second combustor component. The first combustor component is at least partially insertable into the second combustor component, the first combustor component and second combustor component defining a combustion fluid pathway. A combustor seal assembly is located between the first combustor component and the second combustor component. The combustor seal assembly includes a seal support located at the first combustor component and having a plurality of through impingement holes, and a wave-shaped seal disposed at the seal support and defining at least one seal cavity between the wave-shaped seal and the seal support. A peak of the wave-shaped seal is located at a second combustor component. The wave-shaped seal includes at least one through passageway upstream of the peak capable of flowing cooling fluid therethrough into the at least one seal cavity and through the plurality of impingement holes thereby cooling the first combustor component.

According to yet another aspect of the invention, a method for cooling a first combustor component includes locating a combustor seal assembly radially between the first combustor component and a second combustor component. The first combustor component is at least partially insertable into the second combustor component, the first combustor component and second combustor component defining a combustion fluid pathway. Cooling fluid is flowed into at least one through passageway in an upstream portion of a wave-shaped seal of the combustor seal into at least one seal cavity defined by the wave-shaped seal and a seal support. The cooling fluid is flowed from the at least one seal cavity through a plurality of impingement holes in the seal support in flow communication with the first combustor component thereby cooling the first combustor component.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
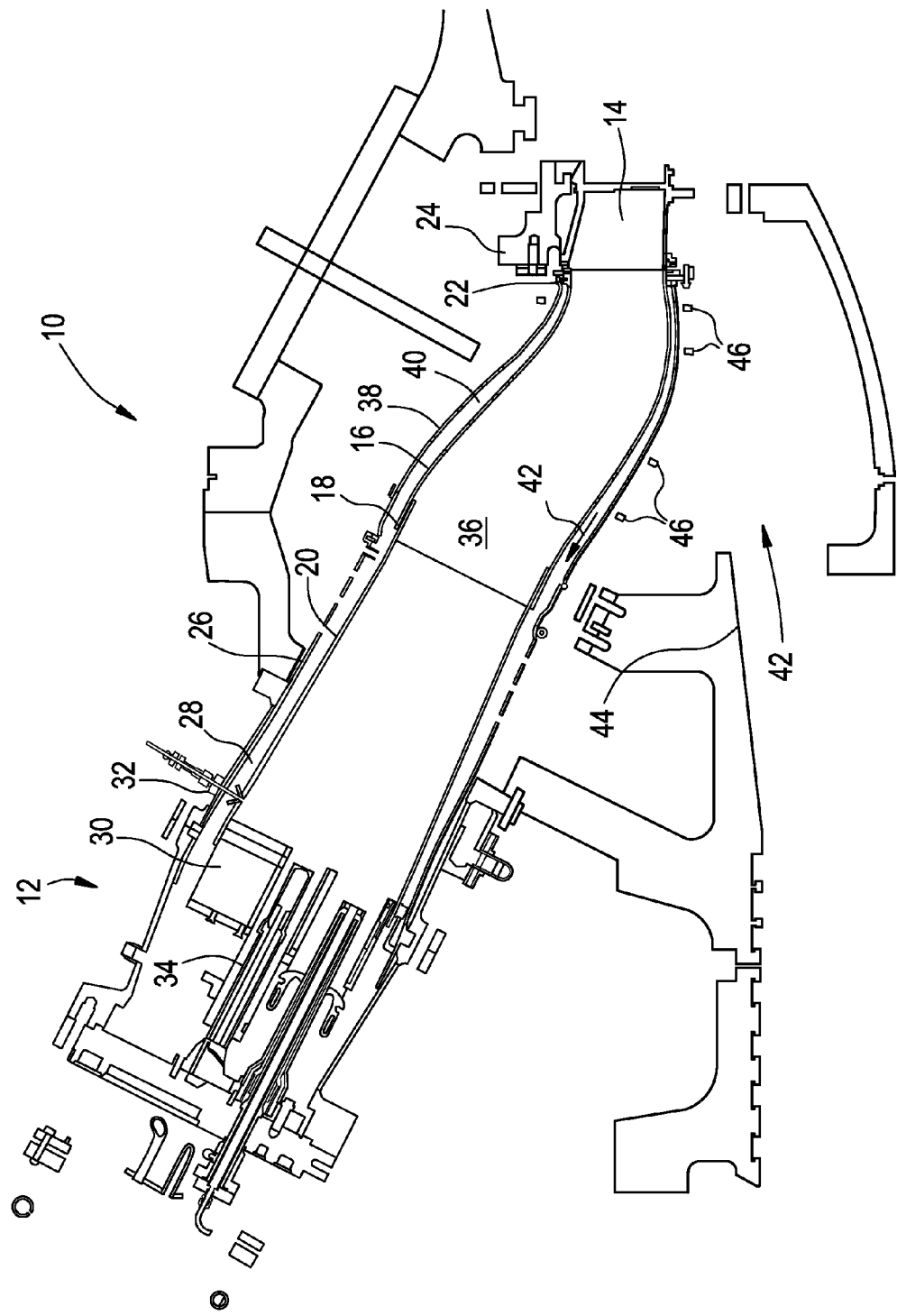
FIG. 1 is a cross-sectional view of an embodiment of a turbomachine.

Shown in FIG. 1 is a partial view of a gas turbine 10. Compressed fluid is provided to a combustor 12 from, for example, a compressor (not shown). Fuel is injected into the combustor 12, mixes with the compressed fluid and is ignited. The hot gas product of the combustion flows to a turbine 14 which extracts work from the hot gas. A transition piece 16 is coupled at an upstream end 18 to the combustor 12 at a combustor liner 20 and at a downstream end 22 to an aft frame 24 of the turbine 14. The transition piece 16 carries hot gas flow from the combustor liner 20 to the turbine 14. The combustor 12 includes a combustor sleeve 26 spaced radially outward from the combustor liner 20 defining a combustor flow channel 28 therebetween. A combustor cap 30 is coupled to an upstream end 32 of the combustor liner 20 and includes at least one nozzle 34 disposed therein and extending into a combustion chamber 36 defined by the combustor cap 30 and the combustor liner 20. An impingement sleeve 38 is coupled to the combustor sleeve 26 and is radially spaced from the transition piece 16 defining a transition flow channel 40 therebetween.

During operation, discharge flow 42 flows from the compressor through a diffuser 44 to the impingement sleeve 38. The discharge flow 42 proceeds through a plurality of holes 46 in the impingement sleeve 38 and toward the combustor 12 in the transition flow channel 40. The discharge flow 42 proceeds from the transition flow channel 40 and through the combustor flow channel 28 until it is finally introduced to the combustor liner 20 through the at least one nozzle 34. In addition to providing air to the combustor 12 for the combustion process, the relatively cool discharge flow 42 further provides much needed cooling to the components exposed to hot combustion gas, for example, the combustor liner 20 and the transition piece 16.

Figure 2:
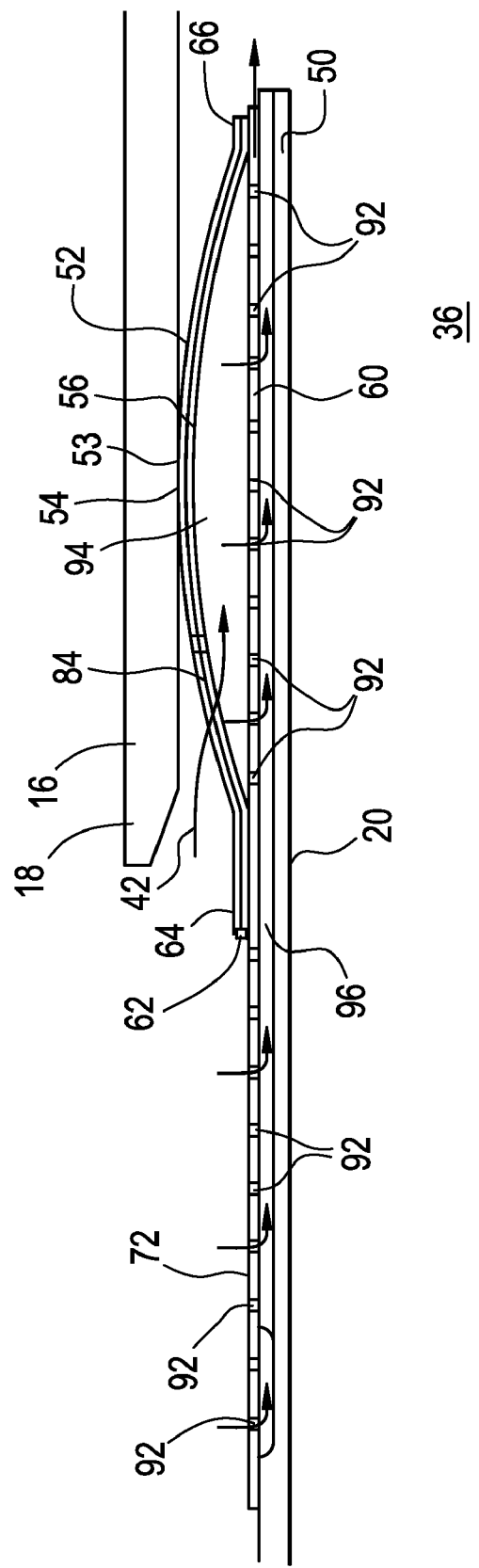
FIG. 2 is a cross-sectional view of an embodiment of a combustor seal.

As shown in FIG. 2, interfaces between adjacent components exposed to hot combustion gas, for example, the transition piece 16 and the combustor liner 20, are configured as lap joints wherein, for example, a downstream end 50 of the combustor liner 20 is configured to be insertable into the upstream end 18 of the transition piece 16. A seal, for example a hula seal 52, is disposed radially between the overlapping portions of the transition piece 16 and the combustor liner 20 and extends perimetrically around the joint. In one embodiment, the hula seal 52 is configured with a wave-shaped cross section and includes two layers, an outer layer 54 and an inner layer 56. The hula seal 52 is configured and disposed with at least one peak 58, such that the at least one peak 58 in the outer layer 54 contacts the transition piece 16. In some embodiments, the hula seal 52 includes at least one seal support 60 disposed between the inner layer 56 and combustor liner 20. The outer layer 54 and the inner layer may be secured to at least one seal support 60 by, for example, at least one weld 62 at an upstream end 64 of the hula seal 52. Although the at least one weld 62 of the embodiment shown in FIG. 2 is disposed at the upstream end 64, in other embodiments the at least one weld 62 may be disposed at a downstream end 66 of the hula seal 52.

Figure 3:
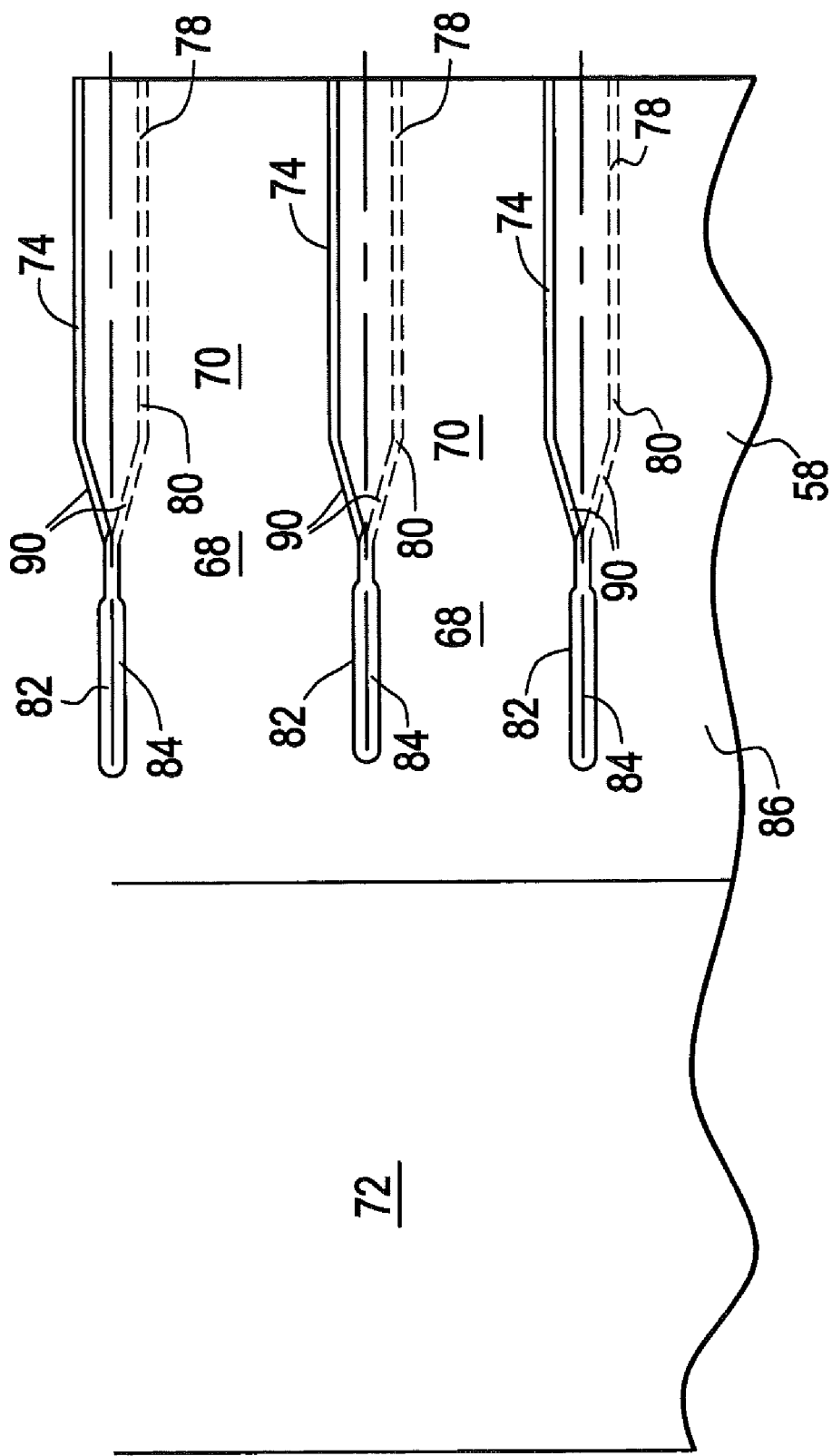
FIG. 3 is a plan view of the combustor seal of FIG. 2.

As shown in FIG. 3, the outer layer 54 and the inner layer 56 comprise a plurality of outer layer fingers 68 and inner layer fingers 70, respectively. The outer layer fingers 68 extend from a rim 72 and include an outer gap 74 between adjacent outer layer fingers 68. Similarly, the inner layer fingers 70 extend from the rim 72 and include an inner gap 78 between adjacent inner layer fingers 70. The inner layer fingers 70 and outer layer fingers 68 are configured such that when the outer layer 54 is placed over the inner layer 56, a covered length 80 of the inner gap 78 is covered by the outer layer fingers 68. A perimetrical location of an open length 82 of the inner gap 78, however, corresponds to a perimetrical location of at least a portion of the outer gap 74, thus creating a plurality of thru passageways 84 through both the outer layer 54 and inner layer 56. The plurality of thru passageways 84 are disposed in only an upstream portion 86 of the hula seal 52, upstream of the at least one peak 58, thus preventing air from the flow channel 40 from entering the combustion chamber 36. To achieve a hula seal 52 having covered lengths 80 and open lengths 82, one or both of the outer gap 74 and the inner gap 78 at each gap location may have a change of direction 90, across which the inner gap 78 extends in a different direction than the outer gap 74, thus creating the covered length 80 via an overlap of an inner layer finger 70 and the outer layer finger 68.

Referring again to FIG. 2, the at least one seal support 60 includes a plurality of through impingement holes 92 through which discharge flow 42 is directed to impinge upon and thus cool the combustor liner 20 beneath the at least one seal support 60. In some embodiments, the plurality of impingement holes 92 is disposed along an entire length of the hula seal 52, including between the upstream end 64 of the hula seal 52 and the downstream end 66 of the hula seal 66. Discharge air 42 enters a seal cavity 94 between the inner layer 56 and the at least one seal support 60 through the plurality of passageways 84. The discharge air 42 is directed through the plurality of impingement holes 92 to impinge on the combustor liner 20, thus cooling the portion of the combustor liner 20 directly beneath the hula seal 52 and the at least one seal support 60. Besides serving to cool the combustor liner 20, the discharge air 42 entering the seal cavity 94 also cools the hula seal 52 to prevent failure of the hula seal 52.

Figure 4:
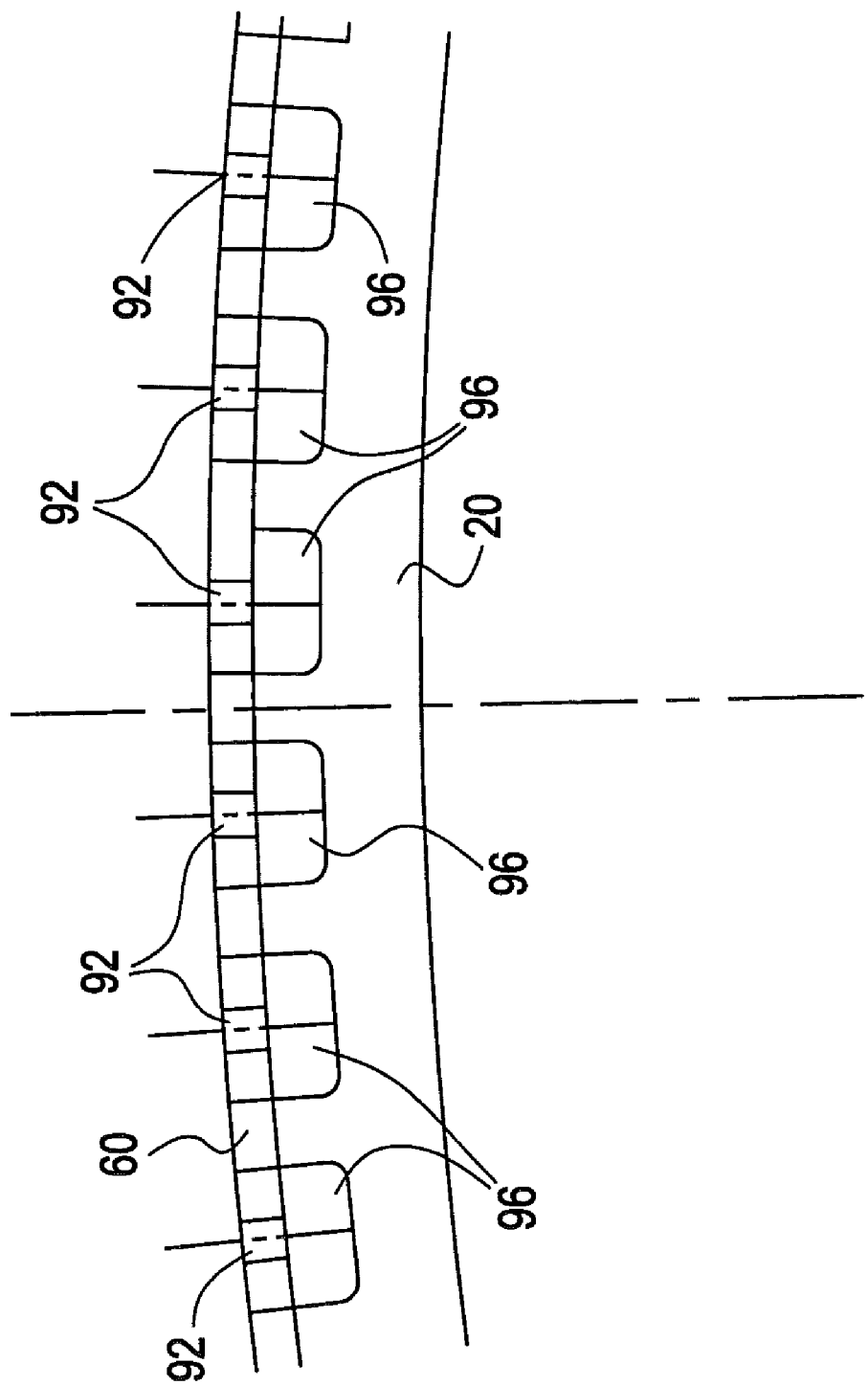
FIG. 4 is a cross-sectional view illustrating an embodiment of cooling channels in a combustor component.

In some embodiments, as shown in FIG. 4, a plurality of cooling channels 96 are disposed between the at least one seal support 60 and the combustor liner 20. The plurality of cooling channels 96 may be formed, for example, as shown in FIG. 4, by forming the plurality of cooling channels 96 into the combustor liner 20, or alternatively by forming the plurality of cooling channels 96 into the at least one seal support 60, or a combination of the two. The plurality of cooling channels 96 are configured and disposed such that discharge flow 42 entering the plurality of impingement holes 92 flows through the cooling channels 96 and into the combustion chamber 36. Thus the discharge flow 42 cools the combustor liner 20 both by impingement along the entire length of the seal support 60 and also by convective flow through the plurality of cooling channels 96.

Figure 5:
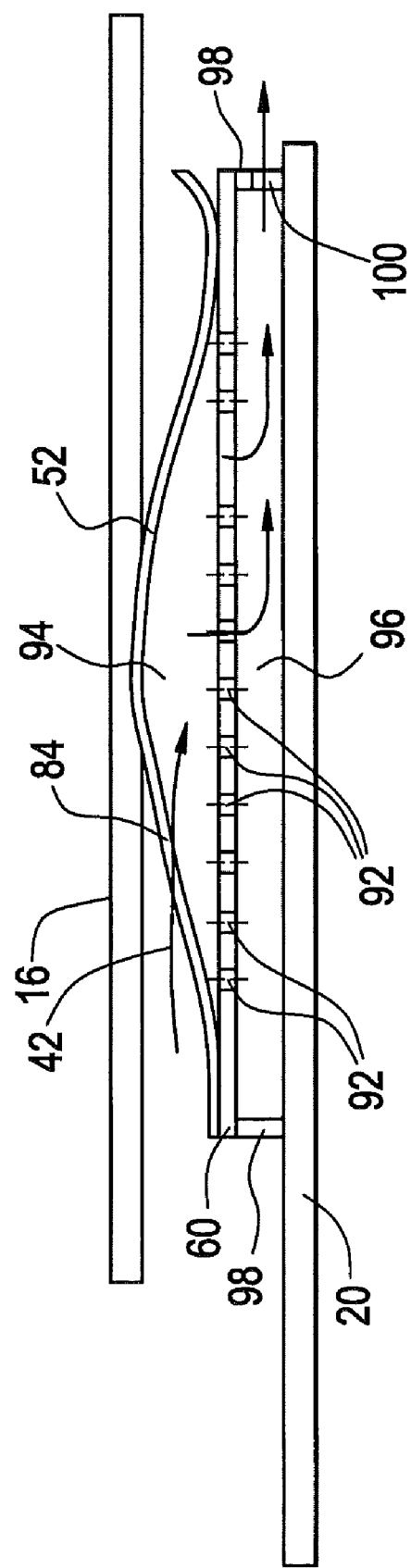
FIG. 5 is a cross-sectional view of an alternative embodiment of a combustor seal.

An alternative embodiment is illustrated in FIG. 5. In this embodiment, the plurality of cooling channels 96 are formed by disposing at least one support leg 98 between the at least one seal support 60 and the combustor liner 20. The discharge flow 42 flows through the plurality of cooling channels 96 as described above and exits the plurality of cooling channels 96 via at least one exit hole 100 disposed in a downstream support leg 102.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combustor seal comprising:
  a seal support having a plurality of through impingement holes, the seal support disposable at a first combustor component;
  a wave-shaped seal disposed at the seal support and defining at least one seal cavity between the wave-shaped seal and the seal support, a peak of the wave-shaped seal disposable at a second combustor component, the wave shaped seal including an outer seal layer and an inner seal layer, wherein the outer seal layer is placed over the inner seal layer, each seal layer having a seal ring and a plurality of seal fingers extending in one direction from the seal ring, adjacent seal fingers having a gap therebetween; and
  at least one through passageway disposed in the wave shaped seal upstream of the peak capable of flowing cooling fluid therethrough into the at least one seal cavity and through the plurality of impingement holes thereby cooling the first combustor component, wherein the gaps of the inner seal layer are circumferentially offset from the gaps of the outer seal layer, and a passageway is formed by overlapping a perimetrical location of each gap of the outer seal layer with a perimetrical location of each gap of the inner seal.

2. The combustor seal of claim 1 wherein the gaps in the outer seal layer overlap with the seal fingers of the inner seal layer downstream of the peak.

3. The combustor seal of claim 1 wherein the wave-shaped seal is secured to the seal support.

4. The combustor seal of claim 1 including at least one support leg extending from the seal support capable of defining at least one flow channel between the seal support and the first combustor component.

5. A combustor comprising:
a first combustor component;
a second combustor component, the first combustor component at least partially insertable into the second combustor component, the first combustor component and second combustor component defining a combustion fluid pathway; and
a combustor seal disposed between the first combustor component and the second combustor component, the combustor seal including:
a seal support having a plurality of through impingement holes, the seal support disposed at the first combustor component;
a wave-shaped seal disposed at the seal support and defining at least one seal cavity between the wave-shaped seal and the seal support, a peak of the wave-shaped seal disposed at a second combustor component, the wave shaped seal including an outer seal layer and an inner seal layer, wherein the outer seal layer is placed over the inner seal layer, each seal layer having a seal ring and a plurality of seal fingers extending in one direction from the seal ring, adjacent seal fingers having a gap therebetween; and
at least one through passageway disposed in the wave shaped seal upstream of the peak capable of flowing cooling fluid therethrough into the at least one seal cavity and through the plurality of impingement holes thereby cooling the first combustor component, wherein the gaps of the inner seal layer are circumferentially offset from the gaps of the outer seal layer, and a passageway is formed by overlapping a perimetrical location of each gap of the outer seal layer with a perimetrical location of each gap of the inner seal layer.

6. The combustor of claim 5 wherein the gaps in the outer seal layer overlap with the seal fingers of the inner seal layer downstream of the peak.

7. The combustor of claim 5 wherein the first combustor component includes a plurality of flow channels in flow communication with the plurality of impingement holes.

8. The combustor of claim 5 wherein the wave-shaped seal is secured to the seal support.

9. The combustor of claim 5 including at least one support leg extending from the seal support thereby defining at least one flow channel between the seal support and the first combustor component.

10. The combustor of claim 5 wherein the first combustor component is a combustor liner.

11. The combustor of claim 5 wherein the second combustor component is a transition piece.

12. A method for cooling a first combustor component comprising:
locating a combustor seal radially between the first combustor component and a second combustor component, the first combustor component at least partially insertable into the second combustor component, the first combustor component and second combustor component defining a combustion fluid pathway;
flowing cooling fluid into at least one through passageway in an upstream portion of a wave-shaped seal of the combustor seal into at least one seal cavity defined by the wave-shaped seal and a seal support, the wave shaped seal including an outer seal layer and an inner seal layer, wherein the outer seal layer is placed over the inner seal layer, each seal layer having a seal ring and a plurality of seal fingers extending in one direction from the seal ring, adjacent seal fingers having a gap therebetween, wherein the gaps of the inner seal layer are circumferentially offset from the gaps of the outer seal layer, and a passageway is formed by overlapping a perimetrical location of each gap of the outer seal layer with a perimetrical location of each gap of the inner seal layer; and
flowing the cooling fluid from the at least one seal cavity through a plurality of impingement holes in the seal support in flow communication with the first combustor component thereby cooling the first combustor component.

13. The method of claim 12 including flowing the cooling fluid through a plurality of flow channels formed in the first combustor component in flow communication with the plurality of impingement holes.

14. The method of claim 12 including flowing the cooling fluid through at least one flow channel formed by disposing at least one support leg between the seal support and the first combustor component.

* * * * *

UNITED STATES PATENT AND TRADEMARK OFFICE
CERTIFICATE OF CORRECTION

PATENT NO. : 8,079,219 B2  
APPLICATION NO. : 12/242013  
DATED : December 20, 2011  
INVENTOR(S) : Johnson et al.

Page 1 of 1

It is certified that error appears in the above-identified patent and that said Letters Patent is hereby corrected as shown below:

Title page, Item (75), under "Inventors", in Column 1, Line 3,
delete "Schoe," and insert -- Shoe, --, therefor.

In Column 5, Line 5, in Claim 1, delete "seal." and insert -- seal layer. --, therefor.

Signed and Sealed this
Twenty-fifth Day of September, 2012

David J. Kappos
*Director of the United States Patent and Trademark Office*